Sept. 28, 1937.  C. W. BALLARD  2,094,519
WALK AND DRIVE EDGING
Filed Feb. 4, 1937
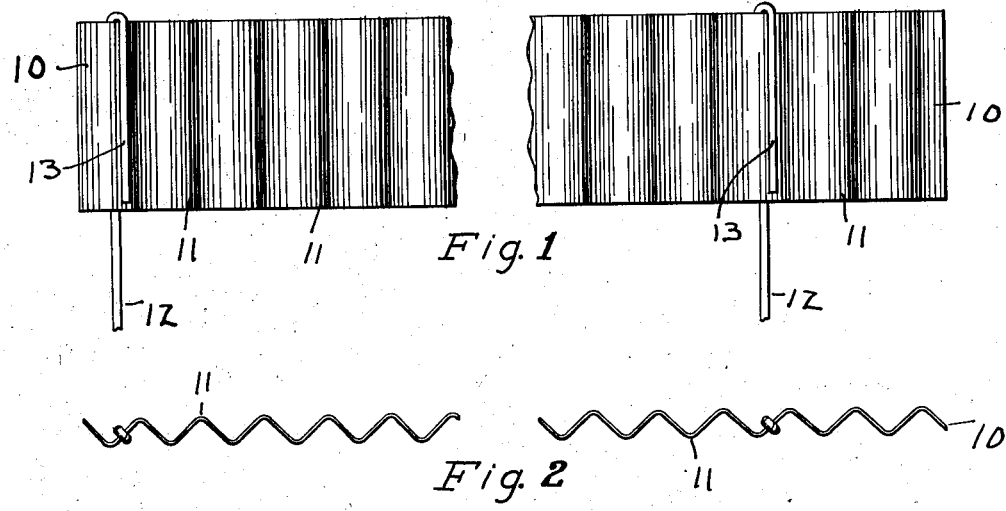
Fig. 1
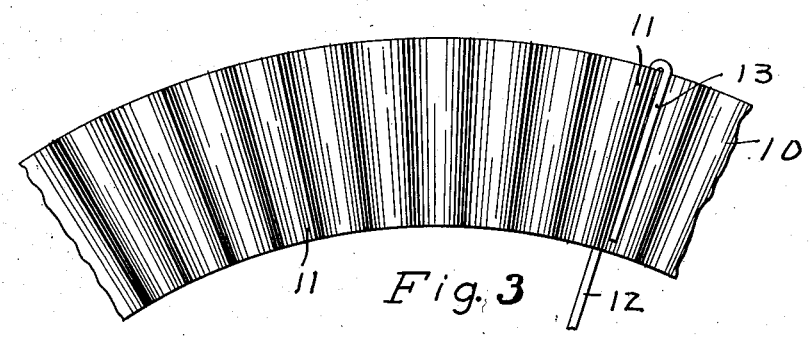
Fig. 2
Fig. 3
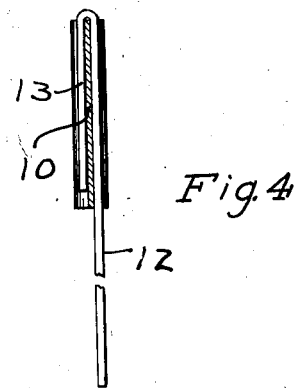
Fig. 4
Inventor,
Clarence W. Ballard,
By Minturn & Minturn,
Attorneys.

Patented Sept. 28, 1937

2,094,519

UNITED STATES PATENT OFFICE 2,094,519

WALK AND DRIVE EDGING

Clarence W. Ballard, Carmel, Ind., assignor of one-half to William M. Rockwood, Indianapolis, Ind.

Application February 4, 1937, Serial No. 124,006

1 Claim. (Cl. 47—33)

This invention relates to metal edging to be used to define walk-ways, flower beds, driveways, and the like. It has been common to employ for this purpose strips of metal three or four inches in width. The metal would be held in an upright position by driving stakes down alongside of the metal whereby the stakes would project from the side of the metal. Where the beds or walks followed an irregular ground contour, the edging in being carried over a high spot would have to be buried at the highest elevation and extend upwardly from the ground unduly at the lowest elevation so that an even projection of the edging above the ground could not be had. Moreover in employing the metal which would be approximately one-eighth inch in thickness, smooth corners could not be formed without taking the metal to some bending machine.

An object of my invention is to provide an edging made out of a soft metal such as zinc and corrugated throughout the length of each strip in a vertical relation so that the edging may be formed with V-shape accordion pleats in vertical relation by squeezing the corrugations closer together at the lower side or extending them at the upper side in a bellows-like action, whereby the edging may be made to project a constant distance above the ground about the walkway or bed. Furthermore an advantage is found in my invention in that by employing the edging in corrugated strips of the soft metal, the ends of the strips may be overlapped without causing an unsightly joint and without having to employ splice plates or the like.

A still further advantage of my invention is that the strips with V-shape accordion pleats corrugated may be readily curved or bent to any desired shape without having to employ special machines or tools to effect the bending. A still further advantage of the invention resides in the fact that in employing the anchor stakes, these stakes may be hooked over the upper edge of the strips and driven into the ground in such manner that there will be no projection of the stakes beyond the planes of the outer edges of the corrugations so that the stakes will not become displaced by objects running along the edging such as lawn mowers and the like.

Another advantage of the invention is that in using the edging about a plot of grass, the grass projecting upwardly immediately at the metal edging may be cut readily by a hand cycle or the like since the grass will be held by the ribs of the corrugations against slipping away from the cycle. In other words, a shearing action can be had.

With these objects and advantages of the invention in mind, reference is made to the accompanying drawing, in which Fig. 1 is a side elevation of an edging strip embodying my invention;

Fig. 2, a top plan view;

Fig. 3, a side elevation showing a fragment of a strip curved to fit over a ridge; and Fig. 4 a detail in vertical section of the engagement of an anchor with the strip.

Like characters of reference indicate like parts throughout the several views in the drawing.

A strip of metal 10 is cut to the desired width and is then corrugated to provide the vertically disposed ribs 11. The strip 10 is preferably made out of a rather soft metal such as zinc which will not only be readily bendable but will be resistant to deterioration when in contact with the earth.

To secure the edging in vertical position, I employ a plurality of stakes 12 each of which is formed to have its upper end turned over and downwardly to provide a hook 13. This hooked end is engaged over the strip 10 from its upper edge when the stake is driven down into the ground until the hook assumes the position as indicated in the drawing. The corrugations like the pleats in the bellows of an accordion are of sufficient depth so that the stake 12 with its hooked end 13 is within the corrugations and does not extend therebeyond as indicated in Fig. 4.

Since the strip 10 is corrugated, the thickness of the metal may be reduced as compared to the thickness required in a flat edging. For example, where a flat edging would be an eighth of an inch thick, by reason of the rigidity provided by the vertical corrugations, the thickness of the metal in my edging may be reduced to one-sixteenth inch so that the total weight of metal for a given length of edging may be actually less than where the flat edging is employed.

While I have herein described and shown my invention in the particular form, it is obvious that structural variations may be employed such as varying the particular form of corrugation employed and the particular form of stakes, without departing from the spirit of the invention as would be obvious to those skilled in the art, and I therefore do not desire to be limited by that precise form beyond the limitations as may be imposed by the following claim.

I claim:

An edging comprising a strip of metal having at least a portion thereof corrugated V-shape in cross-section transversely thereof, said metal being relatively soft whereby, through bellows-like action of the corrugations, the strip may be fitted to irregular contours in vertical relation.

CLARENCE W. BALLARD.